United States Patent Office 3,701,797
Patented Oct. 31, 1972

3,701,797
PROCESS FOR PREPARING DIAMINOMALEONITRILE

Tomio Okada, Yamato, and Norio Asai, Sagamihara, Japan, assignors to Sagami Chemical Research Center, Tokyo, Japan
No Drawing. Filed May 1, 1970, Ser. No. 33,870
Claims priority, application Japan, May 7, 1969, 44/35,044; Aug. 7, 1969, 44/62,691
Int. Cl. C07c *121/20*
U.S. Cl. 260—465.5 R                                   4 Claims

ABSTRACT OF THE DISCLOSURE

Diaminomaleonitrile having the formula:

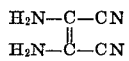

is prepared rapidly and in high yield by polymerization of hydrogen cyanide in the presence of a polar aprotic solvent and a basic material as a catalyst. Particularly, dimethylsulfoxide (DMSO) or dimethylformamide (DMF) is used as the solvent. Diaminomaleonitrile is useful as an intermediate for medicines or industrial chemicals.

BACKGROUND OF THE INVENTION

Diaminomaleonitrile is very useful as a raw material for synthesis of aminoacids and purines. By the hydrolysis of diaminomaleonitrile, glycine which is useful as a food additive or in medicines can be easily obtained in relatively high yield.

Also, diaminomaleonitrile can be isomerized by photochemical reaction to form 4,(5)-cyano-5(4)-aminoimidazole, and by hydrolysis of the latter, 4-aminoimidazole-5-carboxyamide is obtained. This carboxyamide is used in culturing microorganisms. Further, 4,(5) - cyano-5,(4)-aminoimidazole can be reacted with hydrogen cyanide to form adenine which is also used in culturing microorganisms. Also, the compound 4-aminoimidazole-5-carboxyamide can be reacted with KCNO to form xanthine, and the methyl derivatives of xanthine are used in medicines as caffeine, theophylline and theobromine. When 4-aminoimidazole-5-carboxyamide is reacted with hydrogen cyanide, hypoxanthine is obtained, and hypoxanthine is indispensable as a raw material for synthesis of inosinic acid which is a condiment. And also, the compound 4-aminoimidazole-5-carboxyamide can be reacted with cyanogen to obtain guanine which is a fundamental material of nucleic acid. Thus, diaminomaleonitrile has many uses, and is very important material from the industrial viewpoint. However, the production of the above-mentioned compounds has not yet been carried out on a large scale, because no way had been developed for the synthesizing of diaminomaleonitrile on a commercial scale.

About ten processes for preparing diaminomaleonitrile have been disclosed up to the present time. However, they are only laboratory processes. The only process that can be considered for use on an industrial scale is described in U.S. Pat. No. 2,499,441, Ann, 81, 600 (1956). This process comprises polymerizing hydrogen cyanide at a temperature within a range of from 0° C. to 100° C. and in the presence of $Al_2O_3$ or $SiO_2$ as a catalyst. However, this process requires a reaction time of from 20 to 24 hours, and, also the yield at best is only 25%.

DETAILED DESCRIPTION OF THE INVENTION

The object of this invention is to provide a process for preparing diaminomaleonitrile in a short reaction time and in a high yield.

This invention provides a process for preparing diaminomaleonitrile by reacting hydrogen cyanide at a temperature of from normal temperature 25° C. to 150° C. and preferably 50° C.–130° C., in a solvent such as DMSO, DMF etc., and in the presence of a minor amount of basic material such as NaCN, KCN, NaOH, KOH, $NH_3$, $(C_2H_5)_3N$, etc. According to this invention, diaminomaleonitrile in a very high yield can be obtained in the reaction time of from 0.5 hour to 6 hours; therefore, in this point this invention is much superior to the above mentioned prior art. Further, the hydrogen cyanide used as a raw material in this invention is readily available as a by-product of the synthesis of acrylonitrile and is inexpensive. Also, the DMSO or DMF used as solvent is used widely as an industrial solvent in the chemical industry and is readily available and is relatively inexpensive. Further, the basic materials used as the catalyst are readily available and are inexpensive.

The fundmental reaction in this invention comprises a process for preparing tetramer by polymerization of hydrogen cyanide, wherein the reaction rate is in proportion to the product of $CN^-$ concentration and HCN concentration. Since hydrogen cyanide itself has a very low degree of dissociation, it is difficult to increase the $CN^-$ concentration when the solvents are not used or when only water is used as the solvent. With these facts in mind, the inventors experimented and found that the reaction rate of hydrogen cyanide can be increased by the use of DMSO and DMF.

When cyanide ions dissolve in DMSO and DMF their mobility increases markedly and they act as a chemical species, accordingly, by dissolving hydrogen cyanide in the solvent and adding a minor amount of basic material which may be derived from hydrogen cyanide, a cyanohydrogenation reaction equivalent to that of hydrogen cyanide itself can be carried out effectively. In this reaction, in order to prevent over-polymerization and to increase the yield of diaminomaleonitrile, the concentration of reactant, the pH of the reaction system, the reaction temperature and the reaction time can be adjusted to suitable ranges so as to achieve the desired results. The preferred ranges in the reaction system are pH of $10\pm1$, and weight ratio of solvent to hydrogen cyanide of from 2.0 to 5.0.

When the reaction temperature is below normal temperature, the reaction time is prolonged remarkably, and when the reaction temperature is above about 150° C., over-polymerization tends to occur. Therefore, in this invention, the use of a temperature below normal or above 150° C. is not desirable. As the reaction proceeds, the color of the reaction solution changes to black and the viscosity of the solution increases. The completion of reaction can be confirmed by the production of diaminomaleonitrile in the reaction solution. That is, when there is no further increase in the amount of diaminomaleonitrile in the reaction solution the reaction is complete. This can be easily determined by sampling the reaction solution.

In order to separate the diaminomaleonitrile from the reaction system, any of the solvent-extraction processes or a combination of reduced distillation process and solvent-extraction process can be effectively used. The solvents usable in this separating operation include water, alcohol, acetone, ether, dioxane, etc. The simplest process for purification of the diaminomaleonitrile is recrystallization with water or isopropyl alcohol, etc. However, other purification processes can be used, for example, blowing HCl gas into the solution containing diaminomaleonitrile in solvent such as ether, separating the hydrochloride of diaminomaleonitrile, and filtering the hydrochloride, and then recrystallizing the hydrochloride with water, or the sublimation process under high vacuum, are all effective.

In view of the components and the reaction conditions used in the reaction system of this invention, the reaction vessel to be used in the industrial working of this invention need not have any particular anti-corrosion and pressure resistant properties. The conventional vessels which are used in the art may be used, and any closed type vessel having suitable physical strength and volume, and equipped with an agitator can be suitably used for the reaction of this invention.

Since the DMSO or DMF is not changed by the reaction, after the reaction is completed, these solvents can be recovered by the use of suitable distillation apparatus. Also, since the amount of diaminomaleonitrile extracted is determined by the solubility in the solvent used for the reaction and the solvent used for the extraction, a continuous extraction process of the solvent circulating type is preferred.

The following examples are illustrative of preferred embodiments of this invention but are not meant to limit it in any way. A variety of modifications and variations will become obvious to those skilled in the art upon a reading of the present specification, and all such obvious variations and modifications are to be taken as being within the scope of the claims appended hereto.

EXAMPLE 1

150 ml. of DMSO, 63 g. of HCN and 2.0 g. of NaCN were charged into a 300 ml.-autoclave equipped with an agitator, sealed, and then reacted at a temperature of 75° C. for 6 (six) hours. After the reaction was completed, the contents were washed with 1 l. of hot water, and the washed contents were heated to a temperature of 70–80° C., and agitated for several minutes, and then the black polymer in the reaction product was filtered by using a thermostat filter. The filtrate obtained was cold and was allowed to reach room temperature (25° C.), then extracted by addition of about 2 l. of diethylether. The separate yellow ether layer was dried to obtain a solid yellow-brown in color. This extraction operation was repeated several times; the solids obtained were collected and dissolved in about 200 ml. of hot water (80° C.) and then this solution was filtered. The filtrate obtained was permitted to stand for about 30 minutes in an ice bath whereby yellow-brown needles were obtained. This recrystallization operation was repeated until the crystals become almost colorless, then filtered and dried. The melting point and data obtained from infrared spectroscopy, mass spectrometry, nuclear magnetic resonance and elemental analysis confirmed that the crystals obtained were substantially pure diaminomaleonitrile. The amount and yield of the product was 32.1 g. and 51% respectively.

EXAMPLE 2

50 ml. of DMSO, 22 g. of HCN and 0.3 g. of NaCN were charged into a 100 ml.-autoclave equipped with an agitator, sealed, and reacted at 130° C. for 30 minutes. The reaction product was treated as described in Example 1, and 8.2 g. of diaminomaleonitrile was obtained. (Yield 37%.)

EXAMPLE 3

105 ml. of DMSO, 50 g. of HCN and 0.8 g. of NaOH were charged into a 300 ml.-autoclave equipped with an agitator, sealed, and reacted at 75° C. for 6 hours. The reaction product was distilled under a reduced pressure of from 1 to 3 mm. Hg by using a reduced distillation equipment of a thin film wetted wall type until only the fractions boiling at below 70° C. remained. To this residuum, about 200 ml. of diethylether was added and only soluble materials were separated. Then, the solution obtained was dried and purified in the manner described in Example 1. 23.5 g. of diaminomaleonitrile was obtained. (Yield 47%).

EXAMPLE 4

50 ml. of DMSO, 21 g. of HCN and 1.0 g. of $(C_2H_5)_3N$ were charged into a 100 ml.-autoclave equipped with an agitator, sealed, and reacted at 70° C. for 6 hours. The reaction product was treated in the same manner as described in Example 1. 8.2 g. of diaminomaleonitrile was obtained. (Yield 39%.)

EXAMPLE 5

150 ml. of DMSO, 70 g. of HCN and 1.0 g. of KCN were charged into a 300 ml.-autoclave equipped with an agitator, sealed, and reacted at 75° C. for 6 hours. By treating the reaction product in the same manner as described in Example 1, 36.4 g. of diaminomaleonitrile was obtained. (Yield 52%.)

EXAMPLE 6

50 ml. of DMSO, 23 g. of HCN and 1.3 g. of $NH_3$ were charged into a 100 ml.-autoclave equipped with an agitator, sealed, and reacted at 70° C. for 6 hours. The reaction product was treated in the manner described in Example 1. By this treatment, 14.8 g. of diaminomaleonitrile was obtained. (Yield 64%.)

EXAMPLE 7

100 ml. of DMF, 31.6 g. of HCN and 5.0 g. of NaCN were charged into a 200 ml.-pressure vessel made of glass, sealed and reacted at 70° C. for 4 hours. After the reaction was completed, the black reaction product was treated in the manner described in Example 1. 19.3 g. of diaminomaleonitrile was obtained. (Yield 61%.)

EXAMPLE 8

100 ml. of DMF, 25 g. of HCN and 1.0 g. of NaCN were charged into the 300 ml.-autoclave equipped with an agitator, sealed and reacted at 130° C. for 30 minutes. The reaction product was treated in the manner described in Example 1. 9.8 g. of diaminomaleonitrile was obtained. (Yield 39%.)

EXAMPLE 9

100 ml. of DMF, 25 g. of HCN and 4.0 g. of NaOH were charged into a 200 ml.-pressure vessel made of glass, sealed and reacted at 55° C. for 6 hours. The reaction product was distilled under a reduced pressure of from 1 to 3 mm. Hg by using a reduced distillation equipment of a thin film wetted wall type until only fractions boiling at below 60° C. remained. To this residuum, about 300 ml. of diethylether was added and only soluble materials were separated. Then, the solution obtained was dried and purified in the manner described in Example 1. 10.5 g. of diaminomaleonitrile was obtained. (Yield 42%.)

EXAMPLE 10

100 ml. of DMF, 31.6 g. of HCN and 5.0 g. of KCN were charged into a 200 ml.-pressure glass vessel, sealed and reacted at 70° C. for 4 hours. The reaction product was treated in the manner described in Example 1 whereby 12.0 g. of diaminomaleonitrile was obtained. (Yield 38%.)

EXAMPLE 11

100 ml. of DMF, 31.6 g. of HCN and 2.0 g. of $(C_2H_5)_3N$ were charged into a 200 ml.-pressure vessel made of glass and reacted at 70° C. for 5 hours. The reaction product was treated in the manner described in Example 1. 10.2 g. of diaminomaleonitrile was obtained. (Yield 32%.)

We claim:

1. A process for preparing diaminomaleonitrile consisting of polymerizing hydrogen cyanide only in the presence of a reaction system consisting of hydrogen cyanide, dimethylsulfoxide or dimethylformamide solvent and a basic catalyst selected from the group consisting of NaCN, KCN, NaOH, KOH, $NH_3$, and $(C_2H_5)_3N$, at a temperature maintained in the range of from about 25° C. to about 150° C. and at a pH of from 9 to 11.

2. A process according to claim 1, wherein the weight ratio of dimethylsulfoxide or dimethylformamide to hydrogen cyanide is in the range of from 2.0 to 5.0.

3. A process according to claim 1, wherein the solvent is dimethylsulfoxide.

4. A process according to claim 1, wherein the solvent is dimethylformamide.

References Cited

UNITED STATES PATENTS

| | | | |
|---|---|---|---|
| 3,564,039 | 2/1971 | Webster | 260—465.5 R |
| 2,499,441 | 3/1950 | Woodward | 260—465.5 |
| 3,629,318 | 12/1971 | Webster | 260—465.5 R |
| 3,551,473 | 12/1970 | Hartter | 260—465.5 R |

JOSEPH P. BRUST, Primary Examiner